United States Patent
Kawaguchi et al.

(10) Patent No.: US 9,406,046 B2
(45) Date of Patent: Aug. 2, 2016

(54) RFID SYSTEMS AND METHODS FOR ASSOCIATING IMAGES OF DOCUMENTS WITH RFID TAG-RELATED DATA

(71) Applicant: Intelleflex Corporation, San Jose, CA (US)

(72) Inventors: Dean Kawaguchi, San Jose, CA (US); Peter Arnold Mehring, Los Altos, CA (US)

(73) Assignee: Intelleflex Corporation, San Jose, CA (US)

(*) Notice: Subject to any disclaimer, the term of this patent is extended or adjusted under 35 U.S.C. 154(b) by 134 days.

(21) Appl. No.: 14/198,458

(22) Filed: Mar. 5, 2014

(65) Prior Publication Data

US 2014/0253297 A1 Sep. 11, 2014

Related U.S. Application Data

(60) Provisional application No. 61/774,435, filed on Mar. 7, 2013.

(51) Int. Cl.
| | |
|---|---|
| *G06Q 10/08* | (2012.01) |
| *G06Q 10/10* | (2012.01) |
| *H04N 1/00* | (2006.01) |
| *H04N 1/32* | (2006.01) |

(52) U.S. Cl.
CPC ............... *G06Q 10/10* (2013.01); *G06Q 10/08* (2013.01); *G06Q 10/083* (2013.01); *H04N 1/00342* (2013.01); *H04N 1/32138* (2013.01)

(58) Field of Classification Search
CPC .......... H04N 1/00342; H04N 1/32138; G06Q 10/08; G06Q 10/083; G06Q 10/0833; G06Q 10/087; G06Q 10/0875

See application file for complete search history.

(56) References Cited

U.S. PATENT DOCUMENTS

| | | | | |
|---|---|---|---|---|
| 2005/0205671 A1* | 9/2005 | Gelsomini | ........... | G06K 9/2009 235/384 |
| 2006/0103534 A1* | 5/2006 | Arms | ........... | E01F 13/12 340/572.1 |
| 2006/0238344 A1* | 10/2006 | Kubby | ........... | G06K 19/07758 340/572.1 |
| 2007/0242998 A1* | 10/2007 | Ishio | ........... | G03G 15/6552 399/405 |
| 2008/0063276 A1* | 3/2008 | Vincent | ........... | G06K 9/03 382/182 |
| 2008/0255863 A1* | 10/2008 | Mack | ........... | G06Q 10/08 705/1.1 |
| 2010/0060931 A1* | 3/2010 | Ichikawa | ........... | G06Q 10/10 358/1.15 |
| 2011/0303751 A1* | 12/2011 | Lai | ........... | G06K 19/027 235/492 |

\* cited by examiner

*Primary Examiner* — Andrew Bee
(74) *Attorney, Agent, or Firm* — Zilka-Kotab, PC

(57) ABSTRACT

A method for associating an image of a document with information relating to a radio frequency identification (RFID) tag, according to one embodiment, includes receiving information relating to an RFID tag, the information including at least one of a trip identifier, an identifier of the RFID tag, an identifier of a transport item, and a document identifier; receiving an image of a document; storing the image of the document; associating the image of the document with the information relating to the RFID tag; and storing the association of the image with the information relating to the RFID tag.

28 Claims, 8 Drawing Sheets

RFID SYSTEMS AND METHODS FOR ASSOCIATING IMAGES OF DOCUMENTS WITH RFID TAG-RELATED DATA

RELATED APPLICATIONS

This application claims priority to U.S. Provisional Patent Appl. No. 61/774,435, filed Mar. 7, 2013, which is herein incorporated by reference.

FIELD OF THE INVENTION

The present invention relates to Radio Frequency (RF) systems, and more particularly, this invention relates to associating an image of a document with Radio Frequency identification (RFID) tag-related data.

BACKGROUND

RFID tags are used to collect and store a wide range of important data. However, the memory capacity on currently-available tags is insufficient to store large quantities of information, such image data of a scanned document.

BRIEF SUMMARY

A method for associating an image of a document with information relating to a radio frequency identification (RFID) tag, according to one embodiment, includes receiving information relating to an RFID tag, the information including at least one of a trip identifier, an identifier of the RFID tag, an identifier of a transport item, and a document identifier; receiving an image of a document; storing the image of the document; associating the image of the document with the information relating to the RFID tag; and storing the association of the image with the information relating to the RFID tag.

A method for associating an image of a document with information relating to a radio frequency identification (RFID) tag according to one embodiment includes receiving information relating to an RFID tag, the information including at least one of a trip identifier, an identifier of the RFID tag, an identifier of a transport item, and a document identifier; receiving tag data corresponding to data stored on the RFID tag; associating the tag data with the information relating to the RFID tag; storing the association of the tag data with the information relating to the RFID tag; receiving an image of a document, wherein the image of the document has physical characteristics of an image generated by a mobile device or a scanner; storing the image of the document; associating the image of the document with the information relating to the RFID tag; and storing the association of the image with the information relating to the RFID tag.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of RFID-based storage systems and/or related systems and methods, as well as operation and/or component parts thereof.

In one general embodiment, a method for associating an image of a document with information relating to a radio frequency identification (RFID) tag includes receiving information relating to an RFID tag, the information including at least one of a trip identifier, an identifier of the RFID tag, an identifier of a transport item, and a document identifier; receiving an image of a document; storing the image of the document; associating the image of the document with the information relating to the RFID tag; and storing the association of the image with the information relating to the RFID tag.

In another general embodiment, a method for associating an image of a document with information relating to a radio frequency identification (RFID) tag includes receiving information relating to an RFID tag, the information including at least one of a trip identifier, an identifier of the RFID tag, an identifier of a transport item, and a document identifier; receiving tag data corresponding to data stored on the RFID tag; associating the tag data with the information relating to the RFID tag; storing the association of the tag data with the information relating to the RFID tag; receiving an image of a document, wherein the image of the document has physical characteristics of an image generated by a mobile device or a scanner; storing the image of the document; associating the image of the document with the information relating to the RFID tag; and storing the association of the image with the information relating to the RFID tag.

Figure 1:
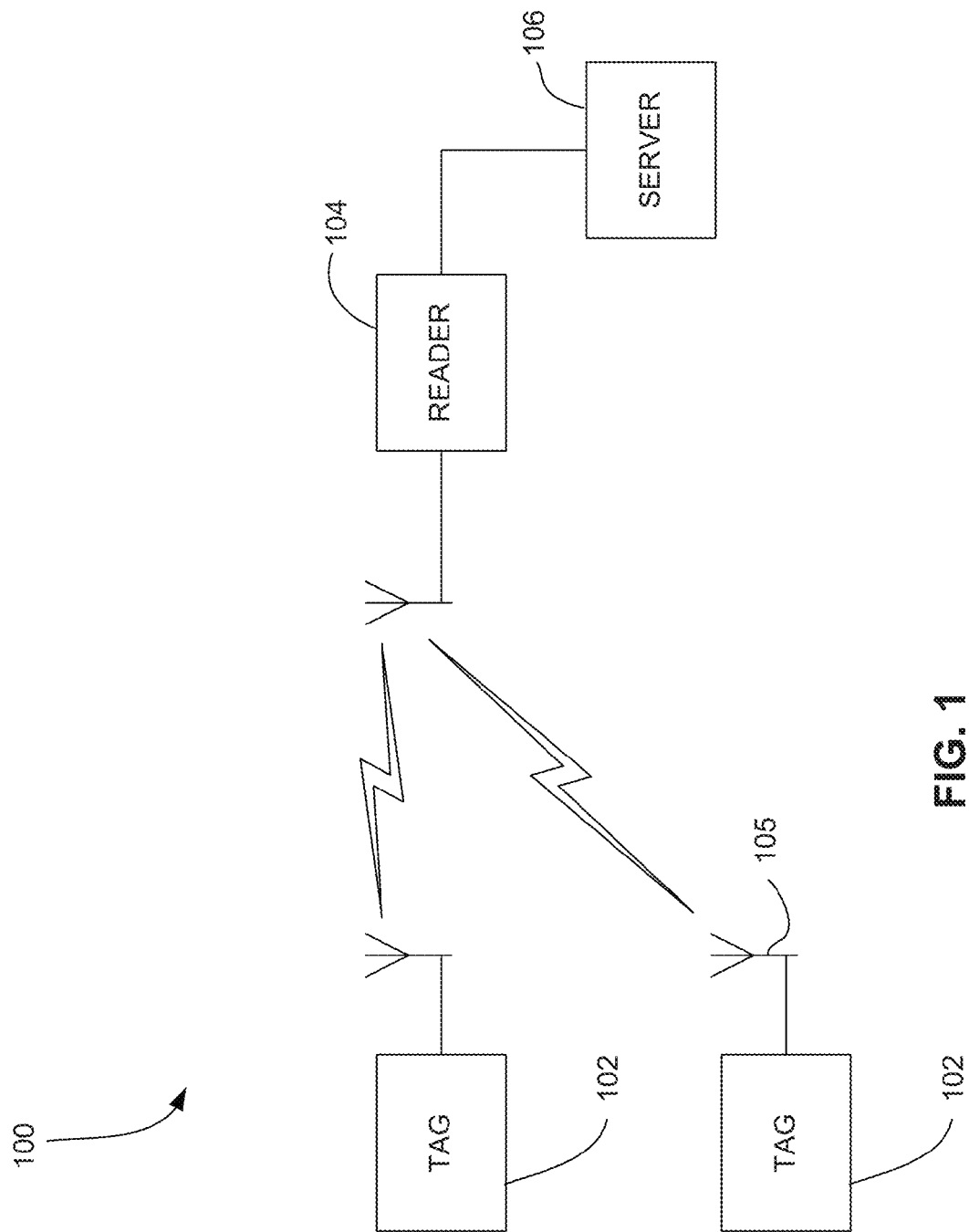
FIG. 1 is a system diagram of an RFID system according to one embodiment.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. In some embodiments, the processor may be configured and/or programmable to perform or control some or all of the methodology presented herein. For example, the processor may be configured to perform various operations by way of logic programmed into a chip; software, firmware, or other instructions being available to a processor; etc. and combinations thereof.

For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator and/or transmitter to send data back to the reader, anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:
1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:
Class-1
  Identity tags (RF user programmable, range ~3 m)
  Lowest cost
Class-2
  Memory tags (20 bit address space programmable at ~3 m range)
  Security & privacy protection
  Low cost
Class-3
  Semi-passive tags (also called semi-active tags and battery assisted passive (BAP) tags)
  Battery tags (256 bits to 2M words)
  Self-Powered Backscatter (internal clock, sensor interface support)
  ~100 meter range
  Moderate cost
Class-4
  Active tags
  Active transmission (permits tag-speaks-first operating modes)
  ~300 to ~1,000 meter range
  Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 2:
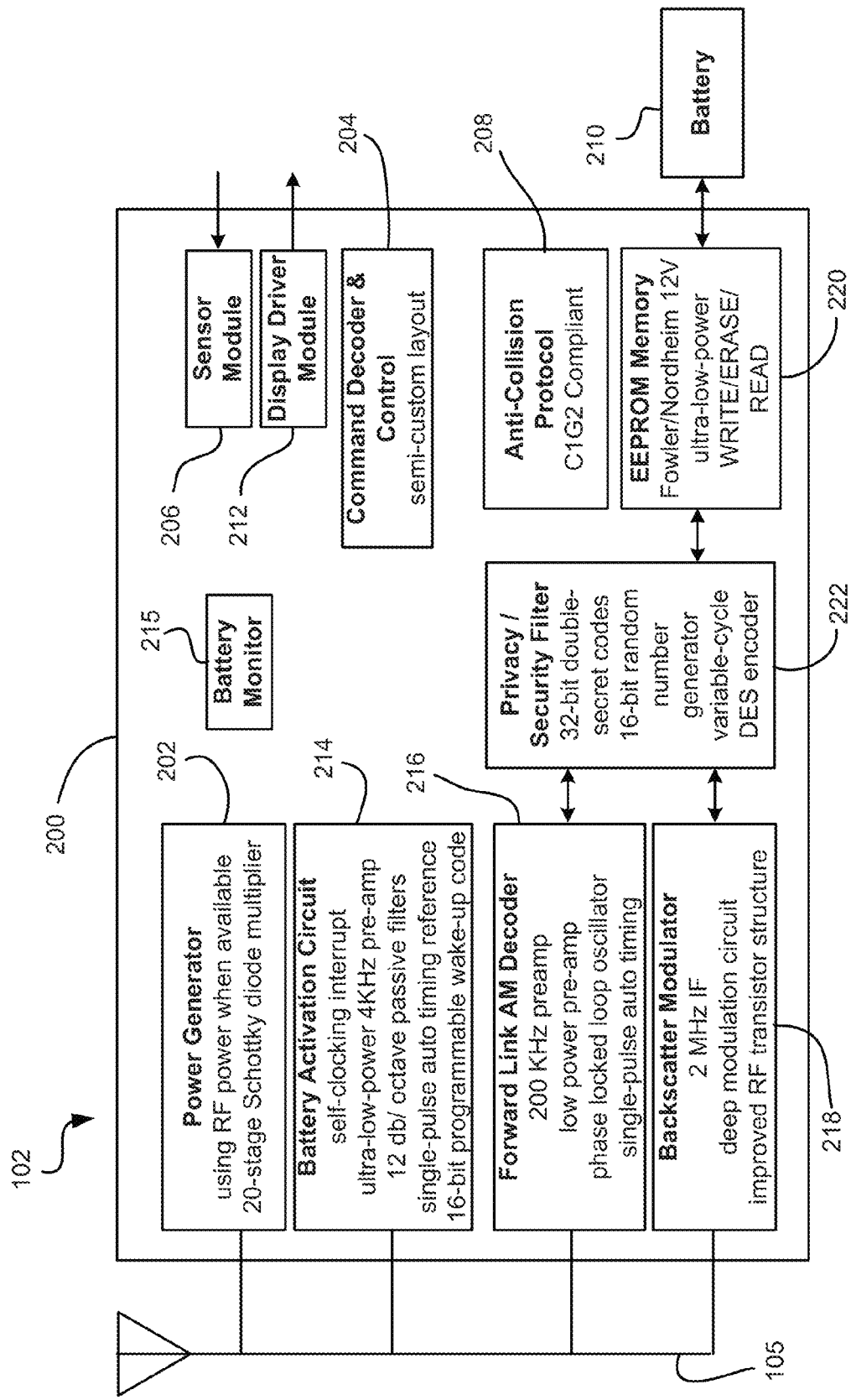
FIG. 2 is a system diagram for an integrated circuit (IC) chip for implementation in an RFID device according to one embodiment.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 $\mu$A/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

The module 200 may also incorporate a security encryption circuit 222 for operating under one or more security schemes, secret handshakes with readers, etc.

As alluded to above, tag data may be stored in memory on an RFID tag. RFID tag data can be any type of data, including sensor data, origination and destination data, ownership data, data about the item to which affixed such as product contents, etc. The tag itself may have an "owner", where "ownership" may refer to outright ownership, as well as a level of control over the tag and/or its use, data, etc. Similarly, ownership can be defined for the tag data, including discrete portions thereof such that each portion may be owned by a different entity. Such "ownership" may refer broadly to some association of a user or entity ("owner") with a discrete portion of the data, as will soon become apparent.

In preferred embodiments, RFID tag data and/or a portion thereof may preferably remain secure to the owner of the tag the tag data such that unauthorized access to the tag data is prevented according to one approach. Moreover, it may be desirable to control access to portions of the RFID tag data upon approved changes to ownership, particularly in the case where a single RFID tag may change ownership at least once e.g., when traversing a supply chain. Upon determining an approved ownership of the RFID tag, an owner may be granted access to at least a portion of the RFID tag data associated with that owner. According to a preferred approach, the tag data may be uploaded and stored on a cloud-based data management system along with ownership information, which may be assigned in the field and written to the tag. The owner of a portion of the data may then be provided access to the data via a computer interface, mobile application on a handheld device, etc. By cloud-based, what is meant is that the data management system is accessible from at least two different remote locations via a network.

According to a preferred approach, ownership designation of the RFID tag data within a cloud-based data management system may mirror its particular ownership segmentation. Thereby the tag data may preferably be segmented by various factors, while additionally maintaining the complete tag data history (explained in further detail below). This may be desirable for applications such as produce delivery or package delivery because the complete shipping history allows for traceability, transfer of ownership information, as well as a complete product timeline.

Figure 3:
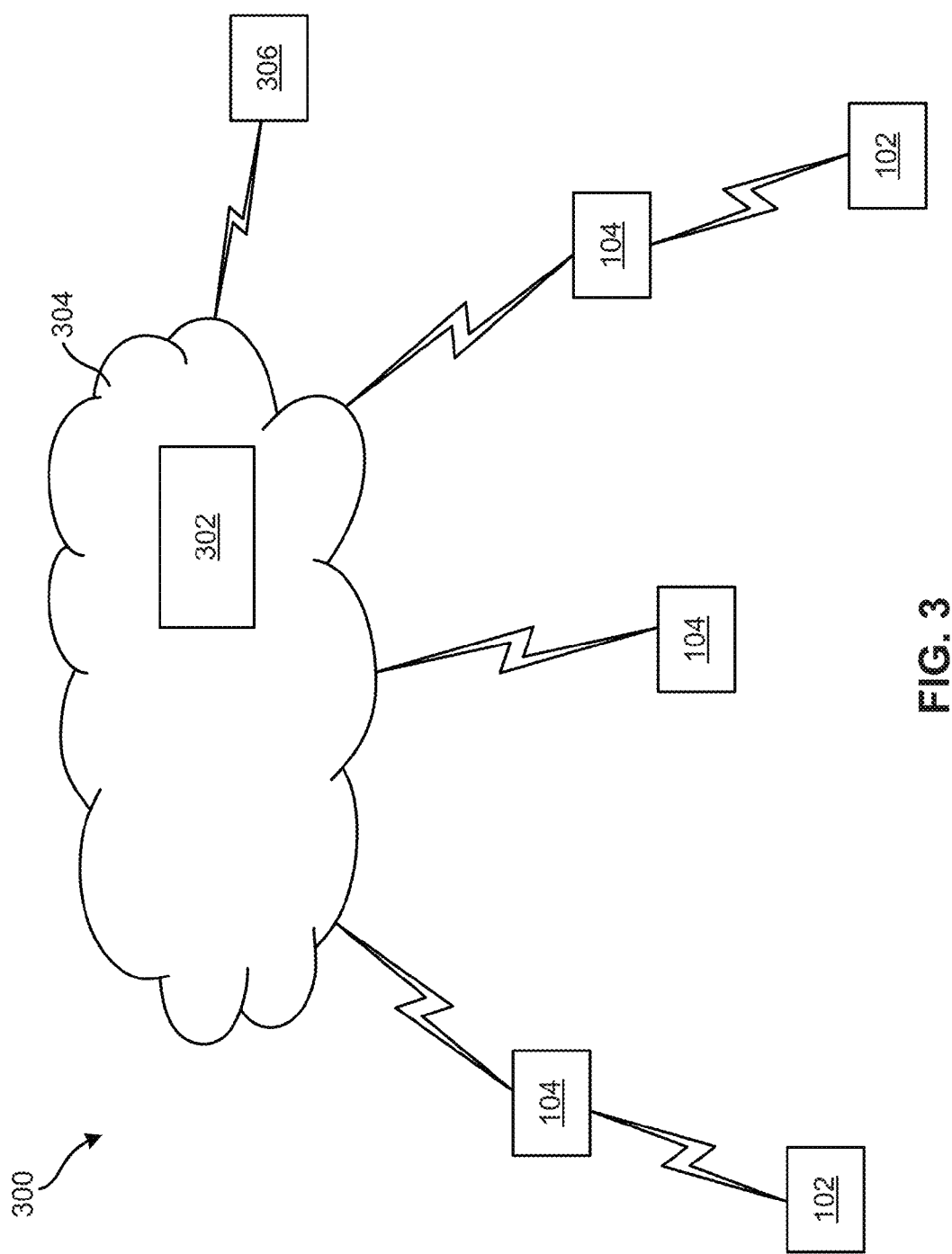
FIG. 3 is a high level representation of a system architecture according to one embodiment.

FIG. 3 illustrates a high level system architecture 300 that includes a cloud-based data management system that has a data management module 302 for storing and controlling access to RFID tag data. As used herein, the cloud-based data management system may include components from the ZEST™ system and/or service, available from Intelleflex Corporation, 2465 Augustine Drive #102, Santa Clara, Calif. 95054, USA.

As an option, the present system 300 may be implemented in conjunction with features from any other embodiment listed herein, such as those described with reference to the other FIGS. Of course, however, components of such architecture 300 and others presented herein may be used in various applications and/or in permutations which may or may not be specifically described in the illustrative embodiments listed herein. Further, various components of the architecture 300 presented herein may be used in any desired environment.

As shown, the architecture 300 includes a data management module 302 residing in a "data cloud" 304, either of which may include one or more computing devices, one or more databases, one or more storage devices, one or more networking devices, etc. RFID readers 104 are in communication with the data management module 302 and/or cloud 300 via any type of known connection, including the internet, mobile telephony network, etc. The RFID readers 104 may communicate with one or more RFID tags 102 to read and/or write tag data and/or other data. Tag data received by an RFID reader 104 may be transmitted to the data management module 302, which, as described in detail below, may store and control access to such data. Upon receiving a request from an authorized user or owner, portions (or all) of the tag data may be transmitted to a user device 306. Note that the foregoing architecture 300 is exemplary only, and those skilled in the art will appreciate the many permutations included in the present disclosure.

With continued reference to FIG. 3, in one approach, the RFID tag data may be sent exclusively to the cloud-based data management system through which ownership may be verified and appropriate access to the data may be made (e.g., via an internet connection).

As will soon become apparent, regarding a new RFID tag, or a tag being reused, an owner may create a connection between the data management module 302 and the new RFID tag by incorporating an RFID tag reader, by scanning a bar code on the RFID tag using a bar code scanner coupled to a computer in communication with the data management module 302, by entering an ID of the tag into an interface with the data management module 302, etc. Moreover, any corresponding product association may also be provided.

Figure 4:
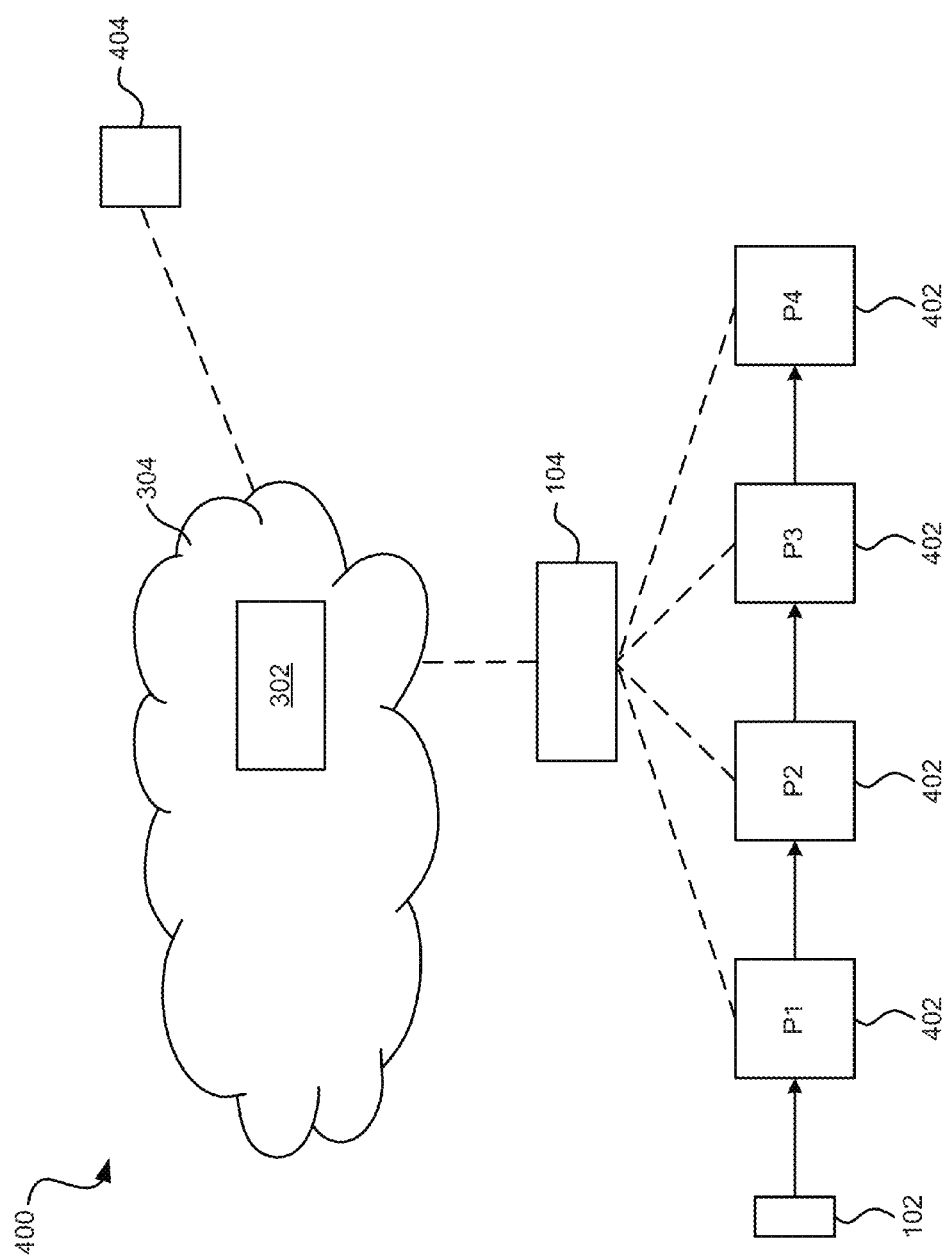
FIG. 4 is a representation of an RFID system according to one embodiment.

Referring now to FIG. 4, a representation an RFID system 400 according to one illustrative embodiment is shown, which may include some or all of the following components and/or other components. As shown in FIG. 1, one or more RFID devices 102 are present. The one or more RFID devices 102 may be attached to a pallet, a container, a crate or other suitable transport item as would be understood by one having skill in the art.

Data may be read from the one or more RFID devices 102 at one or more waypoint locations 402. In various embodiments, the data read from the one or more RFID devices 102 may include, but is not limited to, "waypoint information." As used herein, waypoint information may include information about: a location of the RFID tag, reaching a destination, an event taking place (e.g., entering a password, scanning a barcode, inputting a signature, etc.), a change in custody of the RFID tag, time, an access to the RFID tag by an RFID reader, writing information to the RFID tag, a change (e.g., a spike) in sensor data (e.g. humidity, temperature, presence of bacteria, etc.) collected by the RFID tag, etc. or any other factors which would be apparent to one skilled in the art upon reading the present descriptions. Further, in some embodiments, the RFID tag data may be partitioned in correspondence to data size, periods of time, owner inputs, changes in the data being recorded, etc.

With continued reference to FIG. 4, the data may be transferred via one or more RFID readers 104 to a data management module 302 residing in a "data cloud" 304 and then to a user 404 for real time decision making. As used herein, the user may be a distribution center, a single human operator, a small business entity, etc.

In some embodiments, the one or more waypoint locations 402 may each correspond to a change in or validation of custody or ownership of the RFID tag. For example, each of the one or more waypoint locations 402 (e.g. P1-P4) may correspond to individual ownerships, but may incorporate any approach described and/or suggested herein.

Thereby, in one approach, a single RFID tag may be used and/or reused for multiple ownerships (e.g., jobs, applications, etc.) while maintaining secure access to all data previously collected by the single RFID tag. In another approach, when ownership is granted and/or transferred to a new owner, the previous ownership(s) may expire depending on a number of factors.

In one embodiment, once an ownership is established by any one and/or combination of the approaches listed herein, the duration for which the ownership is valid may be determined by a variety of additional factors and/or the factors used to determine the ownership. Thus, according to various approaches, an ownership, once established, may be valid for a period of time, while certain conditions are met, indefinitely, etc.

As stated immediately above, in one embodiment, an ownership may be valid for a period of time. According to various approaches, at the end of the period of time, the ownership may be reevaluated, automatically expire, be automatically renewed, etc. In another embodiment, an ownership may be valid while certain waypoint information standards are met.

Again, once certain waypoint information standards are no longer met, the ownership may be reevaluated, automatically expire, initiate a timer upon completion of which the ownership expires, etc.

In another approach, a limit may be placed on a number of owners. When a limit of owners is reached (e.g., one, two, three, four, etc.) for overlapping and/or the same portions of the data, one, some, or all of the ownerships may be reevaluated, automatically expire, initiate a timer, etc. According to various approaches, the ownerships may be reevaluated, automatically expire, initiate a timer, etc. in a first in first out (FIFO), first in last out (FILO), last in first out (LIFO), last in last out (LILO), etc. manner, or any other manner which would be apparent to one skilled in the art upon reading the present description.

According to another embodiment, multiple users may be granted ownership of overlapping and/or the same discreet portions of the RFID data. Thus, in one approach, one entity may be granted ownership of a first portion of data, and a second entity may be granted ownership of the first portion of data as well as a second portion of data.

In another approach, multiple users may be granted ownership of unique discreet portions of the data. Thus, each owner may be restricted to a different discreet portion of the data such that preferably none of the discreet portions overlap and/or share any RFID tag data. In one approach, the multiple users may have ownership of their respective discreet portions at the same or different times. In one approach, an ownership may be defined temporally from a change in custody to the owner to a subsequent change in custody from the owner.

As an example, a truck driver may gain ownership of an RFID tag and therefore be allowed to view particular sensor data corresponding to that RFID tag. However, when the package is delivered to a warehouse and the ownership is transferred from the truck driver to the warehouse, because the truck driver's ownership corresponded to a particular sensor data, the warehouse may not be allowed access to the same data. However, the warehouse owner may be allowed to access data gathered while the package is in its custody at the warehouse, until the ownership changes again.

In another approach, an ownership may be approved to at least one item in a group, but not all of the items in the group. As an example, a truck driver may gain ownership of several items on a pallet, which is to be delivered, while he is not granted ownership to the remaining items on the pallet.

According to another embodiment, the original, last, etc. owner(s) may retain full access of a given RFID tag's and/or tags' data in its entirety, e.g., an administrator. In one approach, an administrator may manage at least one, at least some, a majority, all, etc. of the other owners of a particular RFID tag's and/or tags' data. According to various approaches, the administrator may individually define each ownership, may implement a global rule, incorporate logic, etc.

According to one approach, the full data ownership may be valid for the entire life of the RFID tag and/or tags. In an example, a car rental company may retain ownership and full access to the entirety of the RFID tags and RFID tag data for each of the cars the company rents. Although the RFID tag corresponding to each of the rental cars may store a new discreet portion in the RFID tag data for each new rental (e.g., waypoint), the rental company may serve as an administrator, thereby retaining access to RFID tag data from each rental, regardless of the segmentation.

In another approach, an owner may be allowed to manually alter at least some of the other ownerships of the discreet portions of the data. In a preferred approach, at least some of the ownerships may be altered to preferably determine the most effective method for a given situation. In one approach, an owner may include an administrative owner who may have access to a majority or all of the RFID tag data. For example, a shipping warehouse manager may be an administrative owner, thereby having access to the RFID tag data of all the packages in the warehouse to be delivered. The shipping warehouse manager may be able to decide the most efficient method of delivery for any given package based on the required delivery date, delivery parameters, destination, etc.

In a preferred approach, which is in no way intended to limit the invention, an owner may only be allowed to view a summary of the discrete portion of the data pertaining to the owner, but not have erasure and/or amendment privileges. Thus an owner may not be allowed to alter the collected data, sensor settings, RFID tag settings, RFID tag reader settings, etc., thereby ensuring authenticity of the data.

It is well recognized that the transfer of certain documents, including but not limited to shipping invoices and bills of lading, is often difficult due to the multitude of shipping sources and destinations, the distinct handling practices of various companies, damage or misplacement of the documents, etc. The electronic transfer of these documents is also difficult due to network protection firewalls, varying network speeds and bandwidths, etc. Furthermore, scanning and storing images of these documents on RFID tags is impractical and/or impossible. For example, low cost RFID tags with larger memory capacities may have typical storage sizes ranging from 4 Kbits to 64 Kbits; however, typical scanned images of documents require approximately 1 Mbit per page.

Embodiments of the present invention overcome the aforementioned drawbacks by providing a system, method and computer program product for receiving information related to an RFID tag and an image of a document, associating the image of the document with the information relating to the RFID tag and storing: the information relating to the RFID tag; the image of the document; and the association of the image with information relating to the RFID tag. In various approaches, the information relating to the RFID tag, the image of the document, and the association of the image with information relating to the RFID tag are stored on a cloud-based management system.

Figure 5:
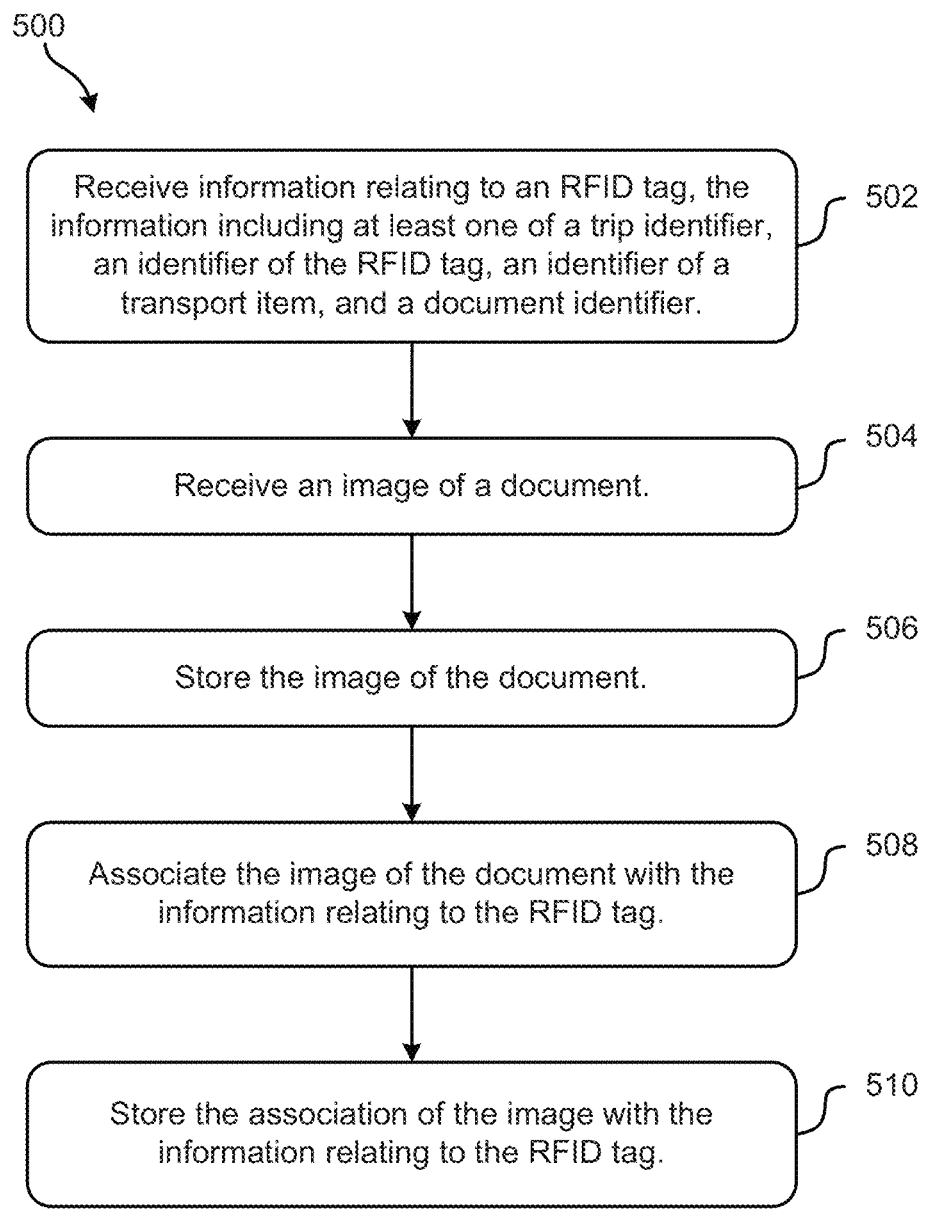
FIG. 5 is a flowchart showing the process steps of a method according to one embodiment.

Referring now to FIG. 5, a method 500 for associating an image of a document with information relating to a radio frequency identification (RFID) tag is illustrated according to an exemplary embodiment. In one approach, the method 500 may be performed at a point of communication with the RFID tag. In another approach, the method 500 may be performed at a remote management system.

As an option, the present method 500 may be implemented in conjunction with features from any other embodiment listed herein, such as those described with reference to the other FIGS. Of course, however, such method 500 and others presented herein may be used in various applications and/or in permutations, which may or may not be specifically described in the illustrative embodiments listed herein. Further, the method 500 presented herein may be used in any desired environment.

As show in FIG. 5 according to one approach, the method 500 includes receiving information relating to an RFID tag. See operation 502. In one approach, the information may be received, e.g., at a cloud-based data management system, via a network from a reader that has retrieved the information from the RFID tag, a local computer in communication with the reader, etc. In another approach, the RFID tag may be a battery assisted passive tag.

The information relating to an RFID tag may include at least one of a trip identifier, an identifier of the RFID tag, an identifier of a transport item, and a document identifier. See operation 502. As used herein, an identifier may be any type of data that uniquely identifies the trip, tag, item, document, etc. or other suitable identifier as would be understood by one having skill in the art upon reading the present disclosure. For example, an identifier may include a timestamp, a description of the contents and/or quantity of the products, positioning data (e.g. GPS, reader position information), shipping address, destination address, receiving address, etc.

In one approach, the identifier may be stored in a memory located in the RFID tag, electrically coupled to the RFID tag, located in an RFID tag reader, electrically coupled to an RFID tag reader, located in a cloud-based data management system, etc. It should be noted that "electrically coupled" in light of the present description preferably includes an electrical connection via a wire, a cable, wirelessly, etc. Further, the memory may include, but is not limited to Electrically Erasable Programmable Read-Only Memory (EEPROM), Static Random-Access Memory (SRAM), Ferroelectric Random-Access Memory (FRAM), etc. In yet another approach, the memory may be located in the RFID tag.

Additionally, a transport item may include, but is not limited to, a crate, pallet, container, etc. or other suitable transport item as would be understood by one having skill in the art upon reading the present disclosure.

In yet another embodiment, the document identifier may include an invoice number associated with the current shipment. In one approach, the invoice number may be input by a user. In another approach, the invoice number may be stored in a memory of the RFID tag.

With continued reference to FIG. 5, the method 500 includes receiving an image of a document. See operation 504. As used herein, the document and/or its image may be of any type and/or of any format. For example, the document may include but is not limited to a Word document, an Excel document, a PDF document, a hand written document, a computer generated document, an original document, a facsimile, an invoice, a bill of lading, etc. Additionally, the document may comprise any type of medium including, but not limited to paper, plastic, vellum, etc.

In some embodiments, the image of a document may include one or more "pages," an image of part of a document, an image of an entire document, an image of multiple pages of a document, etc. or any combination thereof. It should be noted that various approaches may be particularly useful when used with images of paper documents typically used in conjunction with a supply chain.

For instance, in one exemplary approach, the image of the document may include an image of an invoice for at least some contents of a transport item with which the RFID tag is associated such as being directly or indirectly coupled thereto, registered as accompanying the transport item, etc.

In another exemplary approach, the image of the document may include an image of a bill of lading for at least some contents of a transport item with which the RFID tag is associated such as being coupled thereto, registered as accompanying the transport item, etc.

According to another embodiment, the image of the document may have physical characteristics of an image generated by a mobile device such as a camera and/or a device having a camera, with or without additional processing after the image is acquired. Thus, as alluded to, the mobile device may be a standalone camera or the camera may be on another device such as a mobile phone, mobile RFID reader, etc., in some approaches. Also in some approaches, the physical characteristics of an image generated by a mobile device may include one or more of an image skew, differing horizontal dimensions (such as where the top of the document is narrower than the bottom because the camera was not oriented precisely above the center of the document), low resolution, presence of light variations and/or shadows across at least a portion of the page, etc., and other such physical characteristics as would be understood by one skilled in the art upon reading the present disclosure.

In yet another embodiment the image of the document may have physical characteristics of an image generated by a scanner of a type known in the art, such as a dedicated scanner, a scanner/fax/printer multifunction device, etc. Such physical characteristics of an image generated by a scanner may include, but are not limited to, one or more of an image skew, presence of streaks across a portion of the page, presence of color beyond an edge of the page (e.g., overscan), incorrect page orientation, etc.

In a further embodiment, the image of the document may be in a compressed electronic format such as PDF, JPEG, TIFF, etc.

The method 500 also includes storing the image of the document and associating the image of the document with the information relating to the RFID tag, in yet another embodiment. See operation 506 and 508, respectively. In one approach, the image of the document may be stored on a cloud-based data management system. According to some approaches, the image of the document may be associated with the information relating to the RFID tag by correlating an identifier submitted with the image to an identifier in the information relating to the RFID tag, by receiving user input designating the association, by extracting data from the document via OCR to correlate the data to information relating to the RFID tag, etc. or other suitable method of association as would be understood by one skilled in the art upon reading the present disclosure.

Again with reference to FIG. 5, the method 500 includes, in one embodiment, storing the association of the image with the information relating to the RFID tag. See operation 510.

In another embodiment, method 500 may further include receiving sensor data collected by the RFID tag, and associating the sensor data with the image of the document. According to various approaches, the sensor data may include any number of environmental conditions, including but not limited to humidity, Ph, temperature, sunlight, ultraviolet light, chemicals, radioactivity, pathogens, presence of bacteria, presence of viruses, presence of prions, carbon dioxide level, etc. or any other data which would be desired and/or apparent to one skilled in the art upon reading the present description. In one approach, the sensor data may be selected from a group consisting of temperature, humidity, Ph, light such as sunlight and/or ultraviolet light, chemicals, radioactivity, shock, pathogens, presence of bacteria, presence of viruses, presence of prions, and concentration of specific gases such as a carbon dioxide level.

In yet another embodiment, the method 500 may further include extracting textual data from the image of the document, and storing the extracted textual data in an index and/or a relational database. The textual data may be extracted from the image of the document using optical character recognition (OCR), according to one approach.

In a further embodiment, the method 500 may further include outputting data about the tag along with at least one of a pointer, e.g., hyperlink, to the image of the document, a file having the image of the document e.g., as an attachment, and graphical data of the image of the document.

Figure 6:
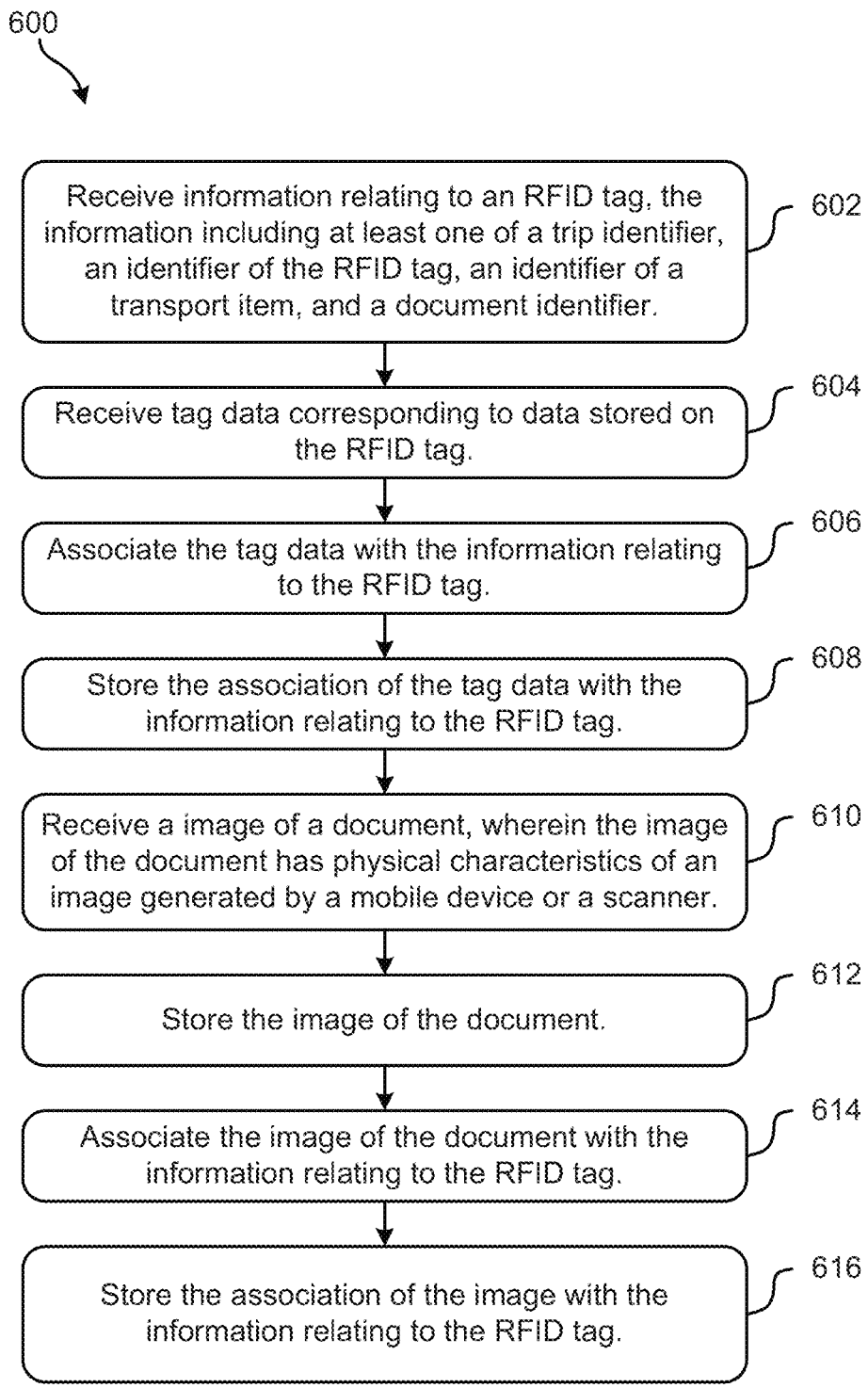
FIG. 6 is a flowchart showing the process steps of a method according to one embodiment.

Referring now to FIG. 6, a method 600 for associating an image of a document with information relating to a radio frequency identification (RFID) tag is illustrated according to an exemplary embodiment. In one approach, the method 600 may be performed at a point of communication with the RFID tag. In another approach, the method 600 may be performed at a remote management system.

As an option, the present method 600 may be implemented in conjunction with features from any other embodiment listed herein, such as those described with reference to the other FIGS. Of course, however, such method 600 and others presented herein may be used in various applications and/or in permutations, which may or may not be specifically described in the illustrative embodiments listed herein. Further, the method 600 presented herein may be used in any desired environment.

As show in FIG. 6, the method 600 includes receiving information relating to an RFID tag, the information including at least one of a trip identifier, an identifier of the RFID tag, an identifier of a transport item and a document identifier. See operation 602. In some approaches, the transport item may be a crate, pallet, container, etc.

The method 600 also includes receiving tag data corresponding to data stored on the RFID tag. See operation 604. In one approach, the tag data may include sensor data collected by the RFID tag. For example, in various approaches, sensor data may include, but is not limited to, humidity, Ph, temperature, sunlight, ultraviolet light, chemicals, radioactivity, pathogens, presence of bacteria, presence of viruses, presence of prions, carbon dioxide level, etc. or any other data which would be desired and/or apparent to one skilled in the art upon reading the present description.

In another approach the tag data may include timestamps, positioning data (e.g., GPS, reader position information), unique product information regarding the product that the RFID tag may be directly or indirectly coupled to, a quantity of the products, a destination of the product, etc.

With continued reference to FIG. 6, the method 600 includes associating the tag data with the information relating to the RFID tag and storing the association of the tag data with the information relating to the RFID tag. See operations 606 and 608, respectively.

The method 600 additionally includes receiving an image of a document, wherein the image of the document has physical characteristics of an image generated by a mobile device or a scanner. See operation 610.

The method 600 also includes storing the image of the document. See operation 612. In operation 614, the image of the document is associated with the information relating to the RFID tag. In operation 616, the association of the image with the information relating to the RFID tag is stored.

Furthermore, according to one embodiment, the method 600 may further include outputting data about the tag along with at least one of a pointer, e.g., hyperlink, to the image of the document, a file having the image of the document e.g., as an attachment, and graphical data of the image of the document.

In addition, method 600 may further include extracting textual data from the image of the document, and storing the extracted textual data in an index and/or a relational database, in another embodiment.

In one illustrative embodiment, a method for associating an image of a document with information relating to a radio frequency identification (RFID) tag is performed at a point of communication with the RFID tag and/or at a remote management system. The method includes receiving information relating to an RFID tag. The information is received, for example, at a cloud-based data management system, via a network from a reader that has retrieved the information from the RFID tag, a local computer in communication with the reader, etc. The RFID tag is a battery assisted passive tag. The information relating to an RFID tag includes at least one of a trip identifier, an identifier of the RFID tag, an identifier of a transport item (such as a crate, pallet, container, etc.), and a document identifier. As used herein, an identifier may be any type of data that uniquely identifies the trip, tag, item, document, etc. For example, an identifier may include an invoice number associated with the current shipment, a timestamp, a description of the product contents and/or quantity of the products, positioning data (e.g. GPS, reader position information), destination address, etc. Additionally, the identifier may be input by a user. Alternatively, the identifier may be stored in a memory located in the RFID tag, electrically coupled to the RFID tag, in an RFID tag reader, electrically coupled to an RFID tag reader, in a cloud-based data management system, etc. As used herein "electrically coupled" includes an electrical connection via a wire, a cable, wirelessly, etc. Furthermore, the memory may include, but is not limited to, Electrically Erasable Programmable Read-Only Memory (EEPROM), Static Random-Access Memory (SRAM), Ferroelectric Random-Access Memory (FRAM), etc. The method also includes receiving an image of a document. As used herein, the document may be of any type and/or of any format including, but not limited to, a Word document, an Excel document, a PDF document, a hand written document, a computer generated document, an original document, a facsimile, etc. The document may comprise any type of medium including, but not limited to, paper, plastic, vellum, etc. For example, in some approaches the document may be a paper invoice, a paper bill of lading, a driver's license, etc. In addition, the image of a document may be one or more "pages," an image of part of a document, an image of an entire document, an image of multiple pages of a document, etc. or any combination thereof. It should be noted that various approaches may be particularly useful when used with images of paper documents typically used in conjunction with a supply chain. For instance, the image of the document may include an image of an invoice for at least some contents of a transport item and/or an image of a bill of lading for at least some contents of a transport item with which the RFID tag is associated (such as being coupled thereto, registered as accompanying the transport item, etc.) The image of the document may further have physical characteristics of an image generated by a mobile device such as a camera. The camera may be a standalone camera or the camera may be on another device such as a mobile phone, mobile RFID reader, etc., in some approaches. The physical characteristics of an image generated by a mobile device may include one or more of an image skew, differing horizontal dimensions (such as where the top of the document is narrower than the bottom because the camera was not oriented precisely above the center of the document), low resolution, presence of light variations and/or shadows across a portion of the page, etc., and other such physical characteristics as would be understood by one skilled in the art upon reading the present disclosure. The image of the document may also have physical characteristics of an image generated by a scanner of a type known in the art. Such physical characteristics of an image generated by a scanner an may include, but are not limited to, one or more of an image skew, presence of streaks across a portion of the page, presence of color beyond an edge of the page (e.g., overscan), incorrect page orientation, etc. Moreover, the image of the document may be in a compressed electronic format such as PDF, JPEG, TIFF, etc. The method also includes storing the image of the document. For example, the image of the document may be stored on a cloud-based data management system. The method further includes associating the image of the document with the information relating to the RFID tag. For instance, the image of the document may be associated with the information relating to the RFID tag by correlating an identifier submitted with the image to an identifier in the information relating to the RFID tag, by receiving user input designating the association, by extracting data from the document via OCR to correlate the data to information relating to the RFID tag, etc. The method additionally includes storing the association of the image with the information relating to the RFID tag. The method may further include receiving sensor data collected by the RFID tag, and associating the sensor data with the image of the document. The sensor data may include any number of environmental conditions, including but not limited to humidity, Ph, temperature, sunlight, ultraviolet light, chemicals, radioactivity, pathogens, presence of bacteria, presence of viruses, presence of prions, carbon dioxide level, etc. or any other data which would be desired and/or apparent to one skilled in the art upon reading the present description. For example, the sensor data may be selected from a group consisting of temperature, humidity, Ph, light such as sunlight and/or ultraviolet light, chemicals, radioactivity, shock, pathogens, presence of bacteria, presence of viruses, presence of prions, and concentration of specific gases such as a carbon dioxide level. In addition, the method may further include extracting textual data from the image of the document, and storing the extracted textual data in an index and/or a relational database. The textual data may be extracted from the image of the document using optical character recognition (OCR). Also, the method may further include outputting data about the tag along with at least one of a pointer, e.g., hyperlink, to the image of the document, a file having the image of the document e.g., as an attachment, and graphical data of the image of the document.

In another illustrative embodiment, a method for associating an image of a document with information relating to a radio frequency identification (RFID) tag is performed at a point of communication with the RFID tag and/or at a remote management system. The method includes receiving information relating to an RFID tag, the information including at least one of a trip identifier, an identifier of the RFID tag, an identifier of a transport item (such a crate, pallet, container, etc.) and a document identifier. The method also includes receiving tag data corresponding to data stored on the RFID tag. For example, the tag data may include sensor data collected by the RFID tag. Further, the sensor data may include, but is not limited to, humidity, Ph, temperature, sunlight, ultraviolet light, chemicals, radioactivity, pathogens, presence of bacteria, presence of viruses, presence of prions, carbon dioxide level, etc. or any other data which would be desired and/or apparent to one skilled in the art upon reading the present description. The tag data may also include timestamps, positioning data (e.g., GPS, reader position information), unique product information regarding the product that the RFID tag may be directly or indirectly coupled to, a quantity of the products, a destination of the product, etc. The method additionally includes associating the tag data with the information relating to the RFID tag and storing the association of the tag data with the information relating to the RFID tag. Furthermore, the method includes receiving an image of a document, wherein the image of the document has physical characteristics of an image generated by a mobile device or a scanner. The method also includes storing the image of the document, associating the image of the document with the information relating to the RFID tag and storing the association of the image with the information relating to the RFID tag is stored. In addition, the method may further include outputting data about the tag along with at least one of a pointer, e.g., hyperlink, to the image of the document, a file having the image of the document e.g., as an attachment, and graphical data of the image of the document. The method include, as well, extracting textual data from the image of the document, and storing the extracted textual data in an index and/or a relational database, in another embodiment.

In yet another illustrative embodiment, a system includes a memory configured for storing data from a radio frequency identification (RFID) tag and a processor configured for processing logic. The system also includes logic for receiving information relating to an RFID tag, the information including at least one of a trip identifier, an identifier of the RFID tag, an identifier of a transport item (such as a crate, pallet, container, etc.), and a document identifier. As used herein, an identifier may be any type of data that uniquely identifies the trip, tag, item, document, etc. For example, an identifier may include an invoice number associated with the current shipment, a timestamp, a description of the product contents and/or quantity of the products, positioning data (e.g. GPS, reader position information), destination address, etc. Additionally, the identifier may be input by a user. Alternatively, the identifier may be stored in a memory located in the RFID tag, electrically coupled to the RFID tag, in an RFID tag reader, electrically coupled to an RFID tag reader, in a cloud-based data management system, etc. As used herein "electrically coupled" includes an electrical connection via a wire, a cable, wirelessly, etc. Furthermore, the memory may include, but is not limited to, Electrically Erasable Programmable Read-Only Memory (EEPROM), Static Random-Access Memory (SRAM), Ferroelectric Random-Access Memory (FRAM), etc. The system also includes logic for receiving an image of a document. As used herein, the document may be of any type and/or of any format including, but not limited to, a Word document, an Excel document, a PDF document, a hand written document, a computer generated document, an original document, a facsimile, etc. The document may comprise any type of medium including, but not limited to, paper, plastic, vellum, etc. For example, in some approaches the document may be a paper invoice, a paper bill of lading, a driver's license, etc. In addition, the image of a document may be one or more "pages," an image of part of a document, an image of an entire document, an image of multiple pages of a document, etc. or any combination thereof. It should be noted that various approaches may be particularly useful when used with images of paper documents typically used in conjunction with a supply chain. For instance, the image of the document may include an image of an invoice for at least some contents of a transport item and/or an image of a bill of lading for at least some contents of a transport item with which the RFID tag is associated (such as being coupled thereto, registered as accompanying the transport item, etc.) The image of the document may further have physical characteristics of an image generated by a mobile device such as a camera. The camera may be a standalone camera or the camera may be on another device such as a mobile phone, mobile RFID reader, etc., in some approaches. The physical characteristics of an image generated by a mobile device may include one or more of an image skew, differing horizontal dimensions (such as where the top of the document is narrower than the bottom because the camera was not oriented precisely above the center of the document), low resolution, presence of light variations and/or shadows across a portion of the page, etc., and other such physical characteristics as would be understood by one skilled in the art upon reading the present disclosure. The image of the document may also have physical characteristics of an image generated by a scanner of a type known in the art. Such physical characteristics of an image generated by a scanner an may include, but are not limited to, one or more of an image skew, presence of streaks across a portion of the page, presence of color beyond an edge of the page (e.g., overscan), incorrect page orientation, etc. Moreover, the image of the document may be in a compressed electronic format such as PDF, JPEG, TIFF, etc. The system also includes logic for storing the image of the document. For example, the image of the document may be stored on a cloud-based data management system. The system further includes logic for associating the image of the document with the information relating to the RFID tag. For instance, the image of the document may be associated with the information relating to the RFID tag by correlating an identifier submitted with the image to an identifier in the information relating to the RFID tag, by receiving user input designating the association, by extracting data from the document via OCR to correlate the data to information relating to the RFID tag, etc. The system additionally includes logic for storing the association of the image with the information relating to the RFID tag. The system may further include logic for receiving sensor data collected by the RFID tag, and associating the sensor data with the image of the document. The sensor data may include any number of environmental conditions, including but not limited to humidity, Ph, temperature, sunlight, ultraviolet light, chemicals, radioactivity, pathogens, presence of bacteria, presence of viruses, presence of prions, carbon dioxide level, etc. or any other data which would be desired and/or apparent to one skilled in the art upon reading the present description. For example, the sensor data may be selected from a group consisting of temperature, humidity, Ph, light such as sunlight and/or ultraviolet light, chemicals, radioactivity, shock, pathogens, presence of bacteria, presence of viruses, presence of prions, and concentration of specific gases such as a carbon dioxide level. In addition, the system may further include logic for extracting textual data from the image of the document, and storing the extracted textual data in an index and/or a relational database. The textual data may be extracted from the image of the document using optical character recognition (OCR). Also, the system may further include logic for outputting data about the tag along with at least one of a pointer, e.g., hyperlink, to the image of the document, a file having the image of the document e.g., as an attachment, and graphical data of the image of the document.

In a further illustrative embodiment, a computer program product includes executable computer code embodied on a computer readable storage medium. The computer program product includes computer code for receiving information relating to an RFID tag, the information including at least one of a trip identifier, an identifier of the RFID tag, an identifier of a transport item (such as a crate, pallet, container, etc.), and a document identifier. As used herein, an identifier may be any type of data that uniquely identifies the trip, tag, item, document, etc. For example, an identifier may include an invoice number associated with the current shipment, a timestamp, a description of the product contents and/or quantity of the products, positioning data (e.g. GPS, reader position information), destination address, etc. Additionally, the identifier may be input by a user. Alternatively, the identifier may be stored in a memory located in the RFID tag, electrically coupled to the RFID tag, in an RFID tag reader, electrically coupled to an RFID tag reader, in a cloud-based data management system, etc. As used herein "electrically coupled"

includes an electrical connection via a wire, a cable, wirelessly, etc. Furthermore, the memory may include, but is not limited to, Electrically Erasable Programmable Read-Only Memory (EEPROM), Static Random-Access Memory (SRAM), Ferroelectric Random-Access Memory (FRAM), etc. The computer program product also includes computer code for receiving an image of a document. As used herein, the document may be of any type and/or of any format including, but not limited to, a Word document, an Excel document, a PDF document, a hand written document, a computer generated document, an original document, a facsimile, etc. The document may comprise any type of medium including, but not limited to, paper, plastic, vellum, etc. For example, in some approaches the document may be a paper invoice, a paper bill of lading, a driver's license, etc. In addition, the image of a document may be one or more "pages," an image of part of a document, an image of an entire document, an image of multiple pages of a document, etc. or any combination thereof. It should be noted that various approaches may be particularly useful when used with images of paper documents typically used in conjunction with a supply chain. For instance, the image of the document may include an image of an invoice for at least some contents of a transport item and/or an image of a bill of lading for at least some contents of a transport item with which the RFID tag is associated (such as being coupled thereto, registered as accompanying the transport item, etc.) The image of the document may further have physical characteristics of an image generated by a mobile device such as a camera. The camera may be a standalone camera or the camera may be on another device such as a mobile phone, mobile RFID reader, etc., in some approaches. The physical characteristics of an image generated by a mobile device may include one or more of an image skew, differing horizontal dimensions (such as where the top of the document is narrower than the bottom because the camera was not oriented precisely above the center of the document), low resolution, presence of light variations and/or shadows across a portion of the page, etc., and other such physical characteristics as would be understood by one skilled in the art upon reading the present disclosure. The image of the document may also have physical characteristics of an image generated by a scanner of a type known in the art. Such physical characteristics of an image generated by a scanner an may include, but are not limited to, one or more of an image skew, presence of streaks across a portion of the page, presence of color beyond an edge of the page (e.g., overscan), incorrect page orientation, etc. Moreover, the image of the document may be in a compressed electronic format such as PDF, JPEG, TIFF, etc. The computer program product also includes computer code for storing the image of the document. For example, the image of the document may be stored on a cloud-based data management system. The computer program product further includes computer code for associating the image of the document with the information relating to the RFID tag. For instance, the image of the document may be associated with the information relating to the RFID tag by correlating an identifier submitted with the image to an identifier in the information relating to the RFID tag, by receiving user input designating the association, by extracting data from the document via OCR to correlate the data to information relating to the RFID tag, etc. The computer program product additionally includes computer code for storing the association of the image with the information relating to the RFID tag. The computer program product may further include computer code for receiving sensor data collected by the RFID tag, and associating the sensor data with the image of the document. The sensor data may include any number of environmental conditions, including but not limited to humidity, Ph, temperature, sunlight, ultraviolet light, chemicals, radioactivity, pathogens, presence of bacteria, presence of viruses, presence of prions, carbon dioxide level, etc. or any other data which would be desired and/or apparent to one skilled in the art upon reading the present description. For example, the sensor data may be selected from a group consisting of temperature, humidity, Ph, light such as sunlight and/or ultraviolet light, chemicals, radioactivity, shock, pathogens, presence of bacteria, presence of viruses, presence of prions, and concentration of specific gases such as a carbon dioxide level. In addition, the computer program product may further include compute code for extracting textual data from the image of the document, and storing the extracted textual data in an index and/or a relational database. The textual data may be extracted from the image of the document using optical character recognition (OCR). Also, the computer program product may further include computer code for outputting data about the tag along with at least one of a pointer, e.g., hyperlink, to the image of the document, a file having the image of the document e.g., as an attachment, and graphical data of the image of the document.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Figure 7:
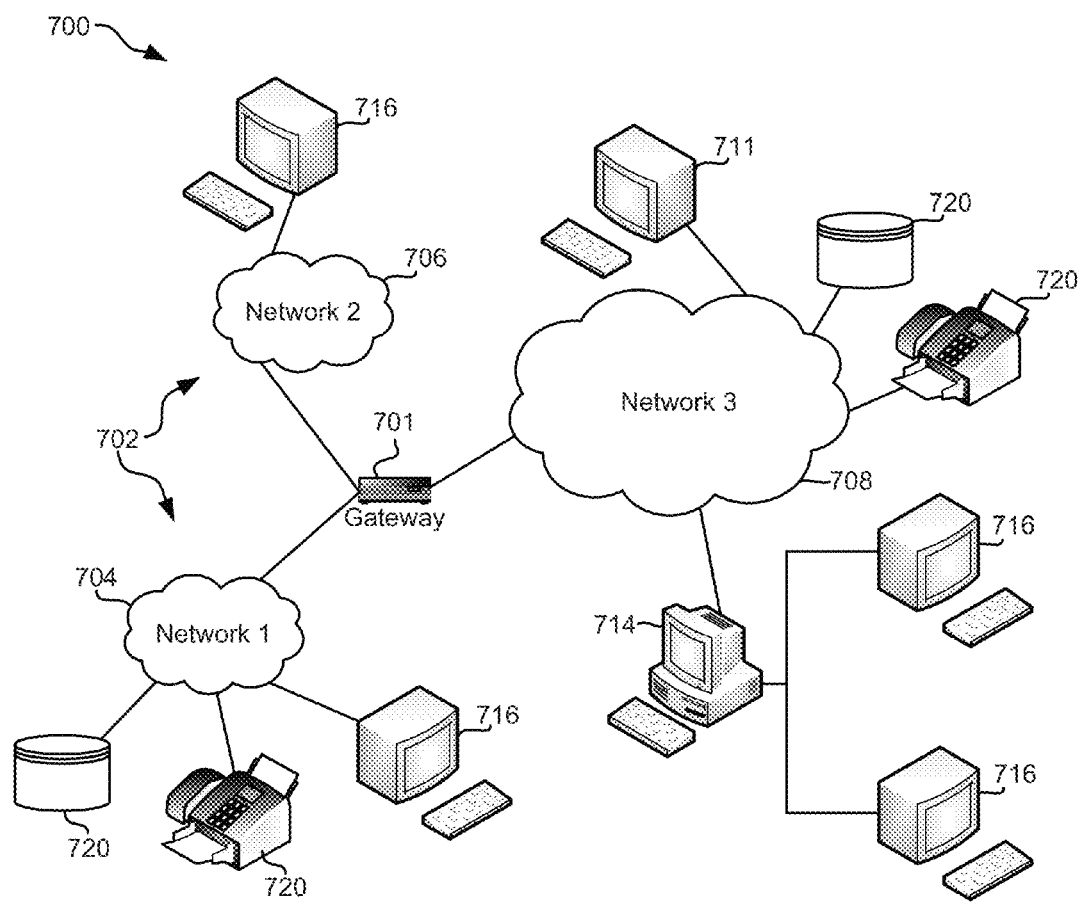
FIG. 7 is a diagram of a network architecture according to one embodiment.

FIG. 7 illustrates a network architecture 700, in accordance with one embodiment. As shown in FIG. 7, a plurality of remote networks 702 are provided including a first remote network 704 and a second remote network 706. A gateway 701 may be coupled between the remote networks 702 and a proximate network 708. In the context of the present network architecture 700, the networks 704, 706 may each take any form including, but not limited to a LAN, a WAN such as the Internet, PSTN, internal telephone network, etc.

In use, the gateway 701 serves as an entrance point from the remote networks 702 to the proximate network 708. As such, the gateway 701 may function as a router, which is capable of directing a given packet of data that arrives at the gateway 701, and a switch, which furnishes the actual path in and out of the gateway 701 for a given packet.

Further included is at least one data server 714 coupled to the proximate network 708, and which is accessible from the remote networks 702 via the gateway 701. It should be noted that the data server(s) 714 may include any type of computing device/groupware. Coupled to each data server 714 is a plurality of user devices 716. Such user devices 716 may include a desktop computer, laptop computer, hand-held computer, printer or any other type of logic. It should be noted that a user device 711 may also be directly coupled to any of the networks, in one embodiment.

A peripheral 720 or series of peripherals 720, e.g. facsimile machines, printers, networked storage units, etc., may be coupled to one or more of the networks 704, 706, 708. It should be noted that databases, servers, and/or additional components may be utilized with, or integrated into, any type of network element coupled to the networks 704, 706, 708. In the context of the present description, a network element may refer to any component of a network.

Figure 8:
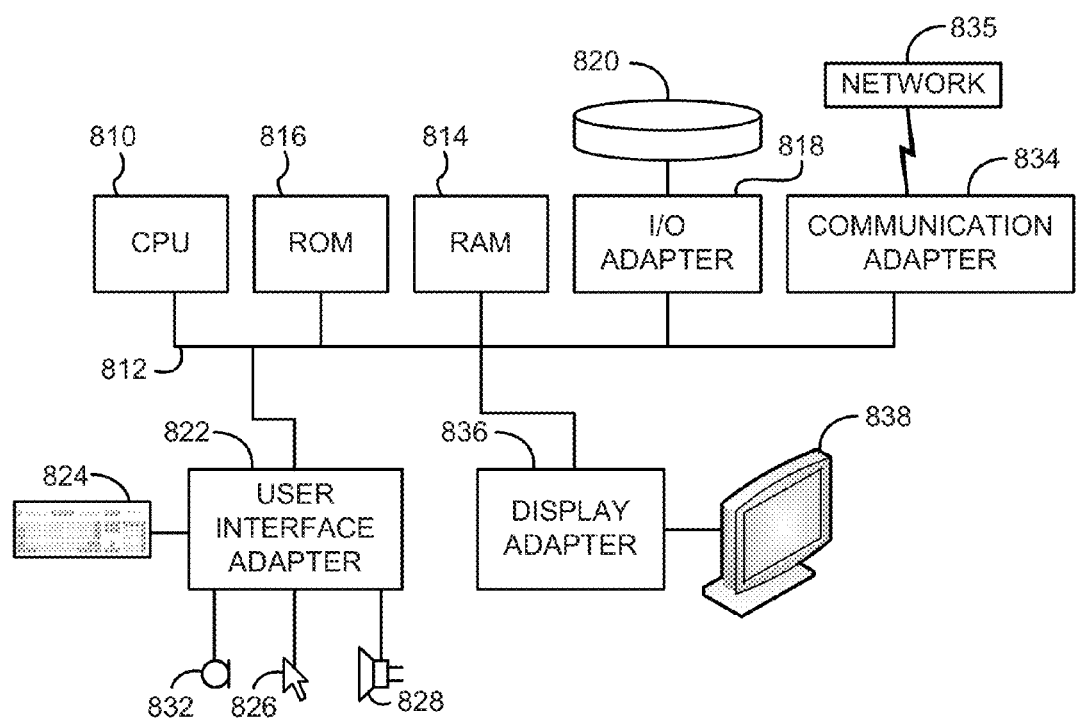
FIG. 8 is a diagram of a hardware environment according to one embodiment.

FIG. 8 shows a representative hardware environment associated with a user device 716 and/or server 714 of FIG. 7, in accordance with one embodiment. Such figure illustrates a typical hardware configuration of a workstation having a central processing unit 810, such as a microprocessor, and a number of other units interconnected via a system bus 812.

The workstation shown in FIG. 8 includes a Random Access Memory (RAM) 814, Read Only Memory (ROM) 816, an I/O adapter 818 for connecting peripheral devices such as disk storage units 820 to the bus 812, a user interface adapter 822 for connecting a keyboard 824, a mouse 826, a speaker 828, a microphone 832, and/or other user interface devices such as a touch screen and a digital camera (not shown) to the bus 812, communication adapter 834 for connecting the workstation to a communication network 835 (e.g., a data processing network) and a display adapter 836 for connecting the bus 812 to a display device 838.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for associating an image of a document with information relating to a radio frequency identification (RFID) tag, comprising:
   receiving information relating to an RFID tag, the information including an identifier of the RFID tag and at least one of: a trip identifier, and an identifier of a transport item;
   receiving an image of a document;
   storing the image of the document;
   associating the image of the document with the information relating to the RFID tag; and
   storing the association of the image with the information relating to the RFID tag.

2. The method of claim 1, wherein the image of the document includes an image of an invoice for contents of a transport item with which the RFID tag is associated.

3. The method of claim 1, wherein the image of the document includes an image of a bill of lading for contents of a transport item with which the RFID tag is associated.

4. The method of claim 1, further comprising receiving sensor data collected by the RFID tag, and associating the sensor data with the image of the document.

5. The method of claim 4, wherein the sensor data is selected from the group consisting of temperature, humidity, Ph, light, chemicals, radioactivity, shock, pathogens, presence of bacteria, presence of viruses, presence of prions, and concentration of specific gases.

6. The method of claim 1, wherein the image of the document is in a compressed electronic format.

7. The method of claim 1, further comprising outputting data about the tag along with at least one of a pointer to the image of the document, a file having the image of the document, and graphical data of the image of the document.

8. The method of claim 1, further comprising extracting textual data from the image of the document, and storing the extracted textual data in an index and/or a relational database.

9. The method of claim 8, wherein the textual data is extracted from the image of the document using optical character recognition.

10. The method of claim 1, wherein the RFID tag is a battery assisted passive tag.

11. The method of claim 1, wherein the image of the document has physical characteristics of an image generated by a mobile device and/or a scanner.

12. The method of claim 1, wherein the RFID tag is physically coupled to a transport item, and wherein the image of the document is an image of a document that includes a description of one or more objects associated with the transport item.

13. The method of claim 12, wherein the transport item is selected from the group consisting of: a crate, a pallet, a carton, a container, and a vehicle.

14. A system, comprising:
a memory configured for storing data from a radio frequency identification (RFID) tag;
a processor and logic integrated with and/or executable by the processor, the logic being configured to:
receive information relating to an RFID tag, the information including an identifier of the RFID tag and at least one of: a trip identifier, and an identifier of a transport item;
receive an image of a document;
store the image of the document;
associate the image of the document with the information relating to the RFID tag; and
store the association of the image with the information relating to the RFID tag.

15. The system of claim 14, further comprising logic configured to receive sensor data collected by the RFID tag, and associating the sensor data with the image of the document, wherein the sensor data including at least one of: humidity, Ph, light, chemicals, radioactivity, shock, pathogens, presence of bacteria, presence of viruses, presence of prions, and concentration of specific gases.

16. The system of claim 14, further comprising logic configured to output data about the tag along with at least one of a pointer to the image of the document, a file having the image of the document, and graphical data of the image of the document.

17. The system of claim 14, further comprising logic configured to extract textual data from the image of the document, and storing the extracted textual data in an index and/or a relational database.

18. The system of claim 14, wherein the RFID tag is a battery assisted passive tag.

19. The system of claim 14, wherein the image of the document has physical characteristics of an image generated by a mobile device or a scanner.

20. The system of claim 14, wherein the RFID tag is physically coupled to a transport item, and wherein the image of the document is an image of an invoice or a bill of lading for one or more objects associated with the transport item.

21. A computer program product, comprising:
executable computer code embodied on a computer readable storage medium, the computer code including:
computer code for receiving information relating to an RFID tag physically coupled to a transport item, the transport item being configured to transport one or more objects, the information relating to the RFID tag including an identifier of the RFID tag and at least one of: a trip identifier, and an identifier of the transport item to which the RFID tag is physically coupled;
computer program code for receiving an image of a document, the document describing at least one of the one or more objects transported via the transport item;
computer program code for storing the image of the document;
computer program code for associating the image of the document with the information relating to the RFID tag; and
computer code for storing the association of the image with the information relating to the RFID tag.

22. The computer program product of claim 21, further comprising receiving sensor data collected by the RFID tag, and associating the sensor data with the image of the document, wherein the sensor data is selected from the group consisting of: humidity, Ph, light, chemicals, radioactivity, shock, pathogens, presence of bacteria, presence of viruses, presence of prions, concentration of specific gases, and combinations thereof.

23. The computer program product of claim 21, further comprising outputting data about the tag along with at least one of a pointer to the image of the document, a file having the image of the document, and graphical data of the image of the document.

24. The computer program product of claim 21, further comprising extracting textual data from the image of the document, and storing the extracted textual data in an index and/or a relational database.

25. The computer program product of claim 21, wherein the RFID tag is a battery assisted passive tag.

26. The computer program product of claim 21, wherein the image of the document has physical characteristics of an image generated by a mobile device or a scanner.

27. A method for associating an image of a document with information relating to a radio frequency identification (RFID) tag, comprising:
receiving information relating to an RFID tag physically coupled to a transport item, the transport item being configured to transport one or more objects, the information including at least one of a trip identifier, an identifier of the RFID tag, an identifier of a transport item, and a document identifier;
receiving tag data corresponding to data stored on the RFID tag, wherein the tag data includes sensor data collected by the RFID tag, the sensor data being selected from the group consisting of: humidity, Ph, light, chemicals, radioactivity, shock, pathogens, presence of bacteria, presence of viruses, presence of prions, concentration of specific gases, and combinations thereof;
associating the tag data with the information relating to the RFID tag;
storing the association of the tag data with the information relating to the RFID tag;
receiving an image of a document, the document describing at least one of the one or more objects transported via the transport item, wherein the image of the document has physical characteristics of an image generated by a mobile device or a scanner;

storing the image of the document;
associating the image of the document with the information relating to the RFID tag; and
storing the association of the image with the information relating to the RFID tag.

28. The method of claim 27, further comprising:
outputting data about the tag along with at least one of a pointer to the image of the document, a file having the image of the document, and graphical data of the image of the document; and
extracting textual data from the image of the document, and storing the extracted textual data in an index and/or a relational database.

\* \* \* \* \*